Aug. 19, 1952     J. E. SENSTOCK     2,607,472
GRAIN UNLOADER FOR TRUCKS AND THE LIKE
Filed Oct. 10, 1949
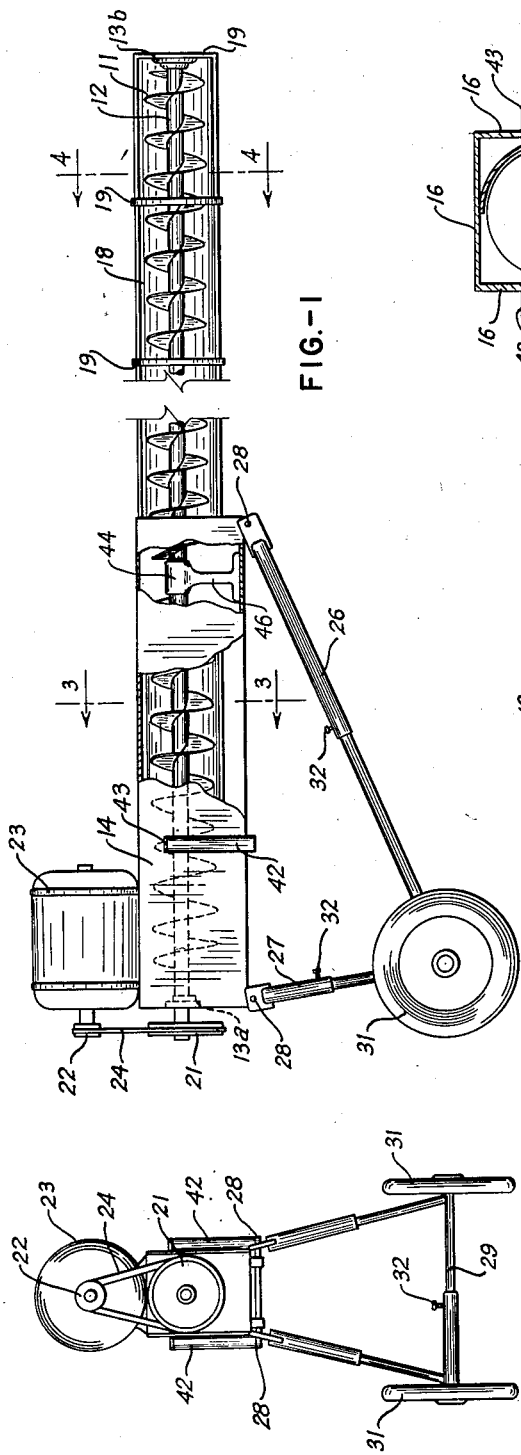
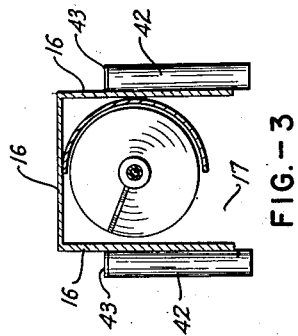
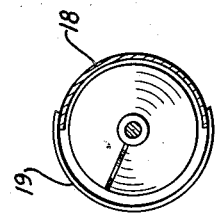
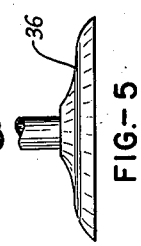
INVENTOR.
John E. Senstock
BY
*H. A. McGrew*
ATTORNEY Patented Aug. 19, 1952

2,607,472

UNITED STATES PATENT OFFICE 2,607,472

GRAIN UNLOADER FOR TRUCKS AND THE LIKE

John E. Senstock, Amherst, Colo.

Application October 10, 1949, Serial No. 120,569

4 Claims. (Cl. 198—233)

This invention relates to a wheel mounted portable grain auger that is detachably supported by an adjustable frame which may be utilized to vary the position of the auger.

Many different types of grain augers have been devised previously; however most all of the grain augers previously designed or manufactured have been used to elevate grain from a low point of reception to a higher point of discharge. The auger to be disclosed is adapted for the special purpose of moving grains out of truck beds, grain storage bins and the like by drawing the grain horizontally along the truck bed or floor of the grain bin. Accordingly the present device may be used in conjunction with other types of elevating mechanisms as a feed auger. When correctly positioned, the auger of this invention will move the grain out of the truck bed or grain bin and discharge the grain into the feed hopper of any other suitable type loading mechanism or upon the auger-supporting ground. Though constructed for special purposes, the auger of the present invention will have many uses and will be of considerable utility inasmuch as it is designed to be light in weight and readily portable.

In devising the present grain auger it has been one object of the inventor to provide a mechanism of economical construction adapted to move grain or other similar products horizontally along the grain supporting surface.

Another object of this invention is to provide a lightweight grain auger adapted to move materials horizontally along their supporting surface that may be readily positioned for use at adjusted elevations.

A further object of this invention is to provide a wheel mounted support frame for grain augers that may be adjusted to raise or lower the grain auger to a proper position of use.

Another object of this invention is to provide an auger supporting stand in which all of the support members thereof are adjustable to vary the length of the members.

Other objects and advantages of the present invention will be apparent from the appended description and drawings in which:

Fig. 1 is an elevation in partial section showing the general arrangement of this invention;

Fig. 2 is an end elevation further showing the features of this invention.

Fig. 3 is a cross section taken along the lines 3—3 of Fig. 1;

Fig. 4 is a cross section taken along lines 4—4 of Fig. 1; and

Fig. 5 is an elevation of a separate type of auger support.

Briefly stated the present invention provides a grain auger the screw flights of which are disposed along a horizontal axis suitably supported by bearing members at the ends thereof. The auger screw is driven by a power unit having the power drive member thereof in alignment with a drive member attached to said screw. The inner extremity or delivery end of the auger is enclosed within a box-like structure which provides an opening in the downwardly disposed face thereof for the delivery of grain. The outer or pickup end of the auger is only partially enclosed by means of a substantially semi-circular shield member which provides the outer bearing support and which is utilized to crowd the grain being moved. In a preferred form, the entire auger is detachably supported by a wheel mounted frame the members of which are all extensible so that the length thereof can be changed in accordance with the particular requirements of the user. In addition to the regular adjustable wheel mounts, the inventor further provides a telescoping post support which may be engaged with the auger.

Referring now to the drawings the relation of the separate elements of this invention is best shown in Fig. 1, wherein it will be noted that screw flights 11 are welded or otherwise attached to a longitudinal shaft 12 which is received in bearing members 13. The bearings 13 are themselves supported by members which enclose or partially enclose the flights 11. The rear bearing 13a is suitably supported by a box-like delivery section 14. This delivery section 14 is of substantially square cross section as shown in Fig. 3 and it is made up of side pieces 16 which are preferably of metal construction. The downwardly disposed face of the delivery section 14 is partially open as shown in Fig. 3 to provide an opening 17 through which the grain may be delivered downwardly to a position of final rest on the ground or into the hopper of a separate type of grain handling equipment.

The outer extremity of the shaft 12 is supported by the bearing 13b which is itself supported by a shield member 18 of substantially semi-circular cross section. Actually the shield 18 is provided with an end member 19 upon which the bearing 13b is mounted. The shield 18 is of such size and shape as to closely encircle about one-half of the circular extent of the flights 11 while the remaining portion of the circular extent of the flights 11 are exposed so that they may be placed in direct engagement with grain or other materials that are to be moved by the grain auger. While Fig. 4 shows the shield member encircling only the one-half of the flights 11 disposed to one side of a vertical line through the axis of the shaft 12, it is possible to rotate the shield 18 so that any other portion of the flight 11 may be covered by the shield 18. This selective positioning of the shield 18 is possible since the shield is mounted for rotation and reciprocation within the delivery section 14.

Since rotation of the shield 18 from the position as shown in Fig. 4 could expose the screw flights 11 directly to the grain supporting floor, hoop members 19 are attached to the shield at spaced points to maintain the screw flight 11 in a position out of contact with the grain supporting floor (not shown).

In order to rotate the shaft 12 and thereby to move any grain in contact with the flights 11 toward the delivery section 14, a pulley member 21 is connected to the shaft 12. The pulley or drive member 22 of a motive power unit 23 is aligned with the pulley 21 and the members 21 and 22 are interconnected by means of a belt 24 or the like in such manner that rotation of the drive member 22 causes rotation of the pulley 21 and thereby the shaft 12. In the embodiments shown the motive power unit 23 is an electric motor which is mounted directly upon the upper face 16 of the delivery section 14. For use where electrical power is not available it will be apparent that a gasoline engine or the like may likewise be mounted upon the upper face 16 of the delivery section to provide the necessary motive power.

While the auger of this invention may be used without providing further support for the delivery section 14 or the other members of the auger, it is sometimes desirable to have the auger mounted on a supporting frame. However, when the device is being used to move grain materials out of a low grain bin or the like, a frame support is often unnecessary, accordingly any support members to be provided should be readily detachable from the auger. The present inventor has devised both a wheel mounted frame support and a stationary frame support which are separately useful when the auger of this invention is being used in different ways. The first and preferred form of mounting utilizes forward and rear extension members 26 and 27 respectively which are pivotally attached to the delivery section 14 at opposite sides 16 of the delivery section by means of removable pins 28. Extension members 26 and 27 further interconnect the sides 16 of the delivery section 14 with an extensible axle 29 upon which wheels 31 are mounted to provide wheeled support for the auger.

When the foregoing type of frame support is used the vertical position of the auger may be changed by changing the amount of elongation of the extension members 26 and 27. In order to change the length of these members the set screws 32 are loosened, the members are shortened or extended as desired and the set screws are again engaged to hold the auger in the desired position. Besides providing for the extension of the support members 26 and 27, the inventor likewise provides for the extension of the axle 29. This feature is provided so that the wheels 31 can be positioned to straddle a hopper or other grain receiving member while still providing full support for the auger.

A separate type of support as shown in Fig. 5 is provided for alternate use. This support comprises a telescoping stand 34 made up of a base 36, an upright tubular member 37, a second tubular member 38 of smaller diameter for telescoping reception in the tubular member 37, and a lock screw 39 for holding the member 38 in adjusted position. The upper end 41 of the tubular member 38 is adapted for engagement in the cylindrical socket 42 attached to the opposite sides 16 of the delivery section 14 as shown in Figs. 1, 2 and 3. A cylindrical shaped socket 42 is provided with an upper cap 43 which engages the upper end 41 of the tube 38 to provide support for the delivery end of the auger. When this type of support is used the outer or pickup end of the auger is necessarily supported by a truck bed or grainery floor.

The particular design for an auger which has been described has several other advantages not previously mentioned inasmuch as standard parts can be used to provide a number of styles of augers having different capacities. For example, if it is desired to provide an auger with a longer reach than ordinary, it is only necessary in most instances to provide a longer shaft with the screw flight material thereon since the shield itself may be adjusted through a limited range to provide the needed elongation. If a still longer auger is desired, a separate screw and separate shield need only be provided since for all installations the delivery section and support members are the same.

When a long auger is desired it is often advisable to provide a central bearing support for the auger to prevent undue vibration or whiplash of the shaft 12. A means for providing such support is shown in Fig. 1 where it will be noted that a bearing member 44 adapted to give full circle support to the shaft 12 is supported in the delivery section 14 by a support member 46 secured to the bottom of the delivery section. Where a bearing is used, it is necessary to interrupt the flight on the shaft 12. However the grain is moved past the bearing 44 without undue obstruction. As a further modification the sockets 42 may be arranged to telescope similarly to the telescoping arrangement of the stand 34 to provide for additional elevation of the auger.

While separate embodiments of this invention have been shown and described, it will be apparent that the present invention is adaptable to many different modifications and changes. All such modifications and changes as are within the scope of the hereunto appended claims are deemed to be a part of this invention.

I claim:

1. A portable grain auger comprising a boxlike enclosure having a downwardly disposed discharge opening therein, a substantially semi-cylindrical shield supported by said enclosure for reciprocal and rotational movement in the enclosure, a bearing member at one end of said enclosure, a second bearing member at an end of said shield opposite said first bearing, a shaft rotatably mounted between said bearings having screw flights thereon, hoop members on said shield encircling the screw flights for keeping said flights out of contact with the grain supporting floor, a drive member on one end of said shaft, a motive power unit mounted on said enclosure having a drive member thereof in driving engagement with said shaft drive member whereby the shaft is rotated to deliver materials longitudinally from the area adjacent the shield to the discharge opening, and support members for maintainig the discharge end of said auger at adjusted elevations above the supporting ground.

2. Structure in accordance with claim 1 wherein said support members are adapted for telescoping adjustment to maintain the discharge end of said auger at the desired elevation above the ground.

3. Structure in accordance with claim 1 wherein said support members include outwardly extending members on the sides of said box-like enclosure, telescoping members for engagement with said outwardly extending members for maintaining the discharge end of said auger at adjusted elevations above the supporting ground, and set screws for supporting said telescoping members in their adjusted positions.

4. Structure in accordance with claim 1 wherein said support members include telescoping axle members providing a wheel amount, forward and rear extension members pivotally attached to said support members and said axle, and set screws for holding said axle and extension members in adjusted positions.

JOHN E. SENSTOCK.

REFERENCES CITED

The following references are of record in the file of this patent:

UNITED STATES PATENTS

| Number | Name | Date |
|---|---|---|
| 1,735,920 | Fitzhugh | Nov. 19, 1929 |
| 2,290,039 | Ford | July 14, 1942 |
| 2,438,527 | Werner | Mar. 30, 1948 |
| 2,460,661 | Tintes | Feb. 1, 1949 |
| 2,483,290 | Mayrath | Sept. 27, 1949 |
| 2,528,679 | Ballard et al. | Nov. 7, 1950 |